US011757299B2

(12) United States Patent
Chen et al.

(10) Patent No.: US 11,757,299 B2
(45) Date of Patent: Sep. 12, 2023

(54) SYSTEMS AND METHODS FOR ENERGY HARVESTING AND USE IN SUPPORT OF MONITORED PROCESSES AND DEVICES

(71) Applicant: Honeywell International Inc., Morris Plains, NJ (US)

(72) Inventors: Sam Chen, Shanghai (CN); Bin Sai, Delft (NL)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/957,964

(22) PCT Filed: Aug. 16, 2019

(86) PCT No.: PCT/CN2019/101060
§ 371 (c)(1),
(2) Date: Jun. 25, 2020

(87) PCT Pub. No.: WO2021/030949
PCT Pub. Date: Feb. 25, 2021

(65) Prior Publication Data
US 2023/0091658 A1    Mar. 23, 2023

(51) Int. Cl.
*H02J 7/35*    (2006.01)
*H02J 7/00*    (2006.01)
(Continued)

(52) U.S. Cl.
CPC .............. *H02J 7/35* (2013.01); *H02J 7/0068* (2013.01); *H02S 10/20* (2014.12); *H02J 7/345* (2013.01)

(58) Field of Classification Search
CPC .. H02J 7/35; H02J 7/0068; H02J 7/345; H02J 7/00; H02J 7/34; H02S 10/20
See application file for complete search history.

(56) References Cited

U.S. PATENT DOCUMENTS 6,686,721 B1   2/2004  Tzeng
7,605,485 B2  10/2009  Pitchford et al.
(Continued)

FOREIGN PATENT DOCUMENTS

CN    201311307 Y    9/2009
CN    101610043 A   12/2009
(Continued)

OTHER PUBLICATIONS

Examination report dated Apr. 22, 2022—Indian Patent Application No. 202217003381.
(Continued)

*Primary Examiner* — Robert L Deberadinis
(74) *Attorney, Agent, or Firm* — Ortiz & Lopez, PLLC; Kermit D. Lopez; Luis M. Ortiz

(57) ABSTRACT

Methods and system include power harvesting with process and device monitoring. A power management system including a solar cell can be integrated with a display panel into a common housing. A capacitor and a rechargeable battery connected to the power management system can receive power from the solar cell and provide electrical power, first from the capacitor and then second from the rechargeable battery, to electronic components including the display engaged in monitoring processes and devices deployed in isolated locations. Electronics can include a microprocessor programmed to provide collected data display on the display panel and wireless transmission to a remote monitoring station. A rotatable stem operated by a step-motor and connected to the common housing can orient the integrated display and solar cell towards sunlight according to an internal time clock synchronizing movement of the display panel via a step motor and thereby maximize harvesting of electrical energy.

20 Claims, 2 Drawing Sheets

(51) Int. Cl.
    *H02S 10/20*     (2014.01)
    *H02J 7/34*     (2006.01)

(56) References Cited

U.S. PATENT DOCUMENTS

| | | |
|---|---|---|
| 9,285,258 B2 | 3/2016 | Hollenberg |
| 9,400,192 B1 | 7/2016 | Salser et al. |
| 10,331,931 B2 * | 6/2019 | Aldor-Noiman ....... G06V 10/84 |
| 2010/0257930 A1 | 10/2010 | Isenmann et al. |
| 2011/0050756 A1 * | 3/2011 | Cassidy .................. G09G 3/20 |
| | | 345/211 |

FOREIGN PATENT DOCUMENTS

| | | |
|---|---|---|
| CN | 207939255 U | 12/2009 |
| CN | 205843751 U | 12/2016 |
| CN | 206019704 U | 3/2017 |
| CN | 106959136 A | 7/2017 |
| GB | 2492845 A2 | 1/2013 |

OTHER PUBLICATIONS

Extended Search Report for corresponding EP Application No. 19941830.2.

* cited by examiner

SYSTEMS AND METHODS FOR ENERGY HARVESTING AND USE IN SUPPORT OF MONITORED PROCESSES AND DEVICES

CROSS-REFERENCE TO RELATED APPLICATION

This patent application is a United States national stage application of International Application No. PCT/CN2019/101060 filed Aug. 16, 2019, which designates the United States, and the entire contents of this international application are hereby incorporated herein by reference in entirety.

TECHNICAL FIELD

Embodiments are generally related to energy harvesting systems. Embodiments further relate to methods and systems for harvesting energy in association with monitored processes and devices. More particularly, embodiments are related to the integration of energy harvesting with displays and use of harvested energy is systems electronically engaged in the monitoring of processes and devices.

BACKGROUND

Many processes and devices are remotely monitored. For example, energy distribution systems are usually monitored and controlled through the use of multiple instruments such as metering devices. The energy distribution industry, for example, has instruments such as metering devices distributed over hundreds of miles with and without remote accessibility. Such metering devices are often battery powered given the remote locations.

Low-powered ultrasonic gas meters, for example, are becoming more popular in massive city and commercial gas distribution networks. They are not only used in replacement of traditional mechanical flow meters that do not need power to run, but also are regarded as maintenance free meters. Nowadays these meters use a high-capacity battery to keep them running for several years, while having to restrain measurement update rates and communications and display frequencies that consume energy and reduce battery lifetime. Nevertheless, more and more IIOT-based wirelessly connected functions are becoming basic requirements for these types of meters, or for use in remotely monitoring of processes and devices, which takes more energy from their batteries. The end user has to replace the battery more often than before as more functions are added to metering/monitoring systems given that available batteries on the market are not able to keep the meters/monitors working for more than 3 years, which is often a minimum required by customers. In the European market, USM meter battery requirements are even tougher, requiring functionality for at least 15 years. So, sustained meter or sensor power is a challenge that needs to be addressed. What is needed are systems and methods that can extend battery life of system engaged in remote process and device monitoring for longer time periods without compromising measurements rates and data communications frequencies.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole. The term "monitoring" as used herein should be read to include metering in association with processes and device that operate remotely and off-grid.

It is an aspect of the disclosed embodiments to provide an energy harvesting device (e.g., solar cell) that can be integrated with a display associated with a system used for monitoring remote processes and devices so that the battery replacement cycle can be extended.

It is another aspect of the disclosed embodiments to provide an energy harvesting device (e.g., solar cell) including a capacitor and a rechargeable battery and that can be integrated with a system used for monitoring remote processes and devices so that the battery replacement cycle can be extended, wherein the capacitor and rechargeable battery are switchable by a power management system so that the capacitor provides first power to the system for monitoring remote processes and then the rechargeable battery provide second power to the system after the capacitor has provided first power.

It is also an aspect of the disclosed embodiments to provide an energy harvesting device (e.g., solar cell) including a capacitor and a rechargeable battery and that can be integrated together with a display associated with a system used for monitoring remote processes and devices so that the battery replacement cycle can be extended, wherein the capacitor and rechargeable battery are switchable by a power management system so that the capacitor provides first power to the system for monitoring remote processes and then the rechargeable battery provide second power to the system after the capacitor has provided first power.

It is a further aspect of the disclosed embodiments to provide an energy harvesting device (e.g., solar cell) that can be integrated together with a display associated with a system used for monitoring remote processes and devices and includes an electromechanical mechanism configured to rotate the display in a manner that optimizes its orientation to solar energy produced by the sun, so that the battery replacement cycle can be extended.

It is a further aspect of the disclosed embodiments to provide an energy harvesting device (e.g., solar cell) that can be integrated together with a display associated with a system used for monitoring remote processes and devices and includes an electromechanical mechanism configured to rotate the display over time in a manner that optimizes its orientation to solar energy produced by the sun, so that the battery replacement cycle can be extended, and a capacitor and a rechargeable battery and that can be integrated together with a display associated with a system used for monitoring remote processes and devices so that the battery replacement cycle can be extended, wherein the capacitor and rechargeable battery are switchable by a power management system so that the capacitor provides first power to the system for monitoring remote processes and then the rechargeable battery provide second power to the system after the capacitor has provided first power.

The aforementioned aspects and other objectives can now be achieved as described herein. In an embodiment, an energy harvesting system includes a power management system including a solar cell integrated with a display panel into a common housing, and a capacitor and a rechargeable battery connected to the power management system to receive power from the solar cell and to provide electrical power first from the capacitor and then second from the rechargeable battery to electronic components including the display that are engaged in monitoring processes and devices deployed in isolated locations, wherein the electronics include a microprocessor, and wherein the microprocessor is programmed to provide data collected from the processes and devices for at least one of display on the display panel and wireless transmission to a remote monitoring station. The system can include laminated safety glass covering the solar cell and display panel.

In another embodiment, a power harvesting system can include a power management system including a solar cell integrated with a display panel into a common housing, and a capacitor and a rechargeable battery connected to the power management system to receive power from the solar cell and to provide electrical power first from the capacitor and then second from the rechargeable battery to electronic components including the display that are engaged in monitoring processes and devices deployed in isolated locations and/or operating off-grid (i.e., where electricity is not being provided by a electrical utility service). The electronics can include a microprocessor, wherein the a microprocessor is programmed to provide data collected from the processes and devices for display on the display panel, and a wireless communications module configured to provide the data via wireless transmission to a remote monitoring station. A rotatable stem operated by a step-motor and connected to the display panel housing can also be provided, wherein the rotatable stem can be oriented by the step-motor towards sunlight according to an internal time clock that can synchronize movement of the display panel via the step motor and stem to maintain its orientation towards the sunlight and thereby maximize harvesting of electrical energy by the solar cell.

In yet another embodiment, a method for harvesting energy in support of a monitored system can include the steps of integrating an energy harvesting module including a solar cell with a display panel in a common housing, a rechargeable battery and a capacitor with a monitored system, maintaining orientation of the display panel towards solar radiation to enable charging of the capacitor and the rechargeable battery, and utilizing electrical energy first from the capacitor and then second from the rechargeable battery to power electrical components associated with monitoring of the monitored system.

Monitoring processes and devices deployed and operating off-grid can include, for example, monitoring of low-pressure ultrasonic gas meters as used with in natural gas distribution systems for the sensing of data from multi-path natural gas flow velocity (e.g., in board and in cloud), temperature and pressure data in line with flow measurement rates (in board and in cloud), temperature and pressure data in line with flow measurement rate (in board and in cloud), battery and super capacitor status data (in board), user's credits and billing data (in board and in cloud), meter health condition monitoring data (in board and in cloud), flow supply integrity data (anti-theft mechanism) in board and in cloud.

These and aspects of the embodiments will become apparent after reading the specification and appended claims provided herein.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
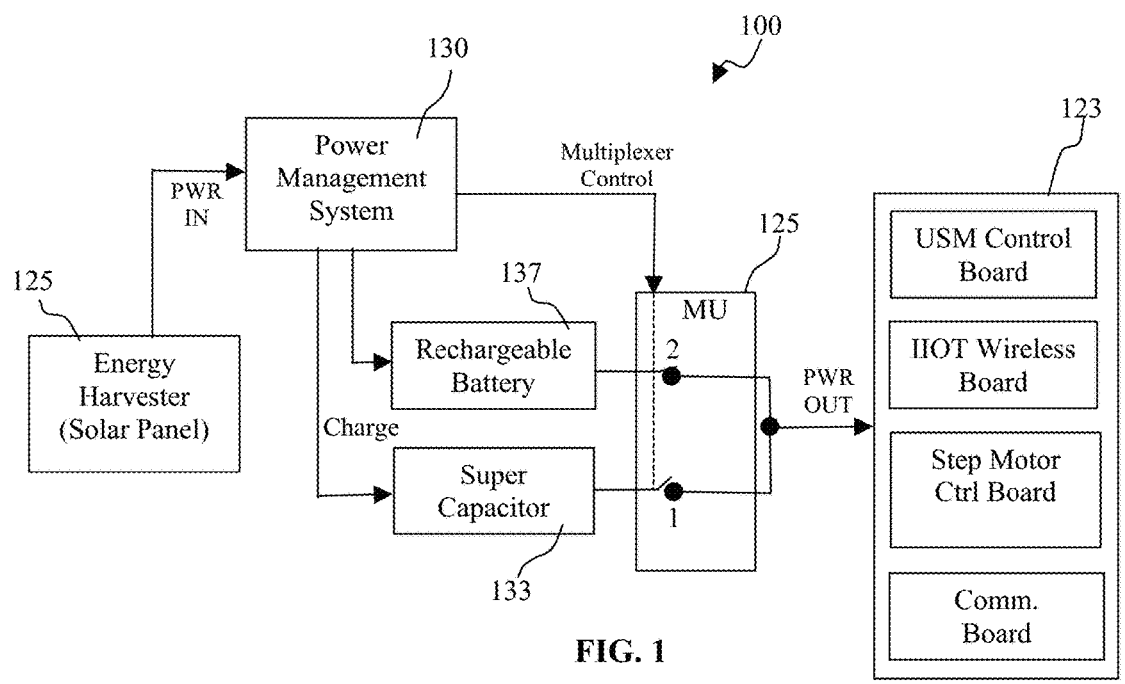
FIG. 1 illustrates a block diagram depicting an exemplary embodiment of an energy harvesting system deployed in association with a monitored process or device, in accordance with an embodiment.

Referring to FIG. 1, illustrated is a block diagram depicting a framework 100 for electrical energy harvesting where electrical power can be provided in support of the monitoring of processes and devices, which can typically be deployed in isolated (e.g., off-grid) locations, in accordance with an embodiment. As shown if FIG. 1, a power management system 130 can be connected to an energy harvester 125, which can be provided in the form of a "solar cell" or panel. A solar panel 125 cab provide electrical energy as "power in" to the power management system 130. The power management system if further connected to both a rechargeable battery 137 and a capacitor 133 (i.e., super capacitor), which can be charged via power provided by the solar cell 125 to the power management system 130. The power management system 130 can also control a multiplexer 135 (i.e., "MUX"), which can further control the flow of "power out" from the capacitor 133 and the rechargeable battery 137 to electronic components 123 that can include, inter alia and for example, a USM control board, a IIOT wireless board, a step motor control board, and a communication board. The power management system 130 together with the multiplexer 135 enable switching of the power supplied to electronic components 123 from the capacitor 133 and the rechargeable battery 137. As shown within the multiplexer 135, switch "1" is open and switch "2" is closed, indicating that power is flowing from the rechargeable battery 133 to the electronic components 123. During operation, electrical power can first flow from the capacitor 137 (switch "1" closed condition) and then the power management system 130 will close switch "2" to provide electrical power from the rechargeable battery 133 before electrical power fully runs out of the capacitor 137. Switchable operation of the capacitor 137 and rechargeable battery 133 to manage the power supply chain ensures adequate energy is provided to electronic components for uncompromised performance and measurements. This is especially true when a monitoring system is connected to wireless communications, such as IIOT, which are otherwise restrained to a certain degree by original battery life given its power requirement.

Figure 2:
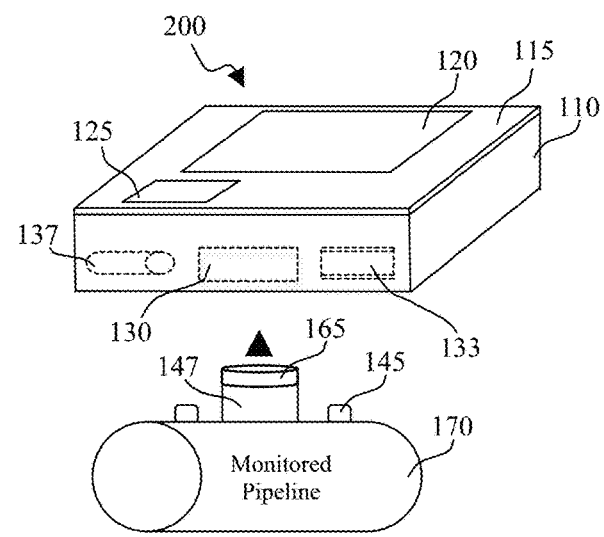

FIG. 2 illustrates a block diagram 200 depicting another exemplary embodiment of an energy harvesting system deployed in association with a monitored process or device that includes an electromechanical mechanism including a stem 147 that is configured to be rotatable by step motor 165, which together can be referred to as a "rotatable stem". The rotatable stem is configured to orient a display 120 associated with the energy harvesting system towards solar energy from the sun, in accordance with an embodiment. As shown in FIG. 2, a display 120 can be integrated with a solar cell 125 in a common housing 110. The display can be provided, for example, in the form of a LCD or LED display. A protective layer 115 can be provided on top of the display 120 and solar cell 125 to keep them from being damaged. The protective layer 115 can be provided, for example, in the form of laminated safety glass covering the solar cell 125 and display panel 120, and can be adhered to the common housing 110. The rechargeable battery 137, power management system 130 and capacitor 133 can also be included in the common housing 110. A monitored pipeline 170 is illustrated in FIG. 2 and an exemplary process or device that is being monitored. Sensors 145 can be integrated in the monitored pipeline 170, with measured data then being provided to housing 110 wherein it can be processed by a microprocessor (see FIG. 4, item 140) and displayed on display 120 or transmitted wirelessly to a remote monitoring station or control room (not shown). When the rotatable stem (combination of stem 147 and step motor 165) is connected to the common housing 110 as indicated by the up arrow, it can cause rotational movement of the housing 110 in order to orient the display 120 and solar panel 125 towards solar energy provided by Earth's Sun.

Figure 3:
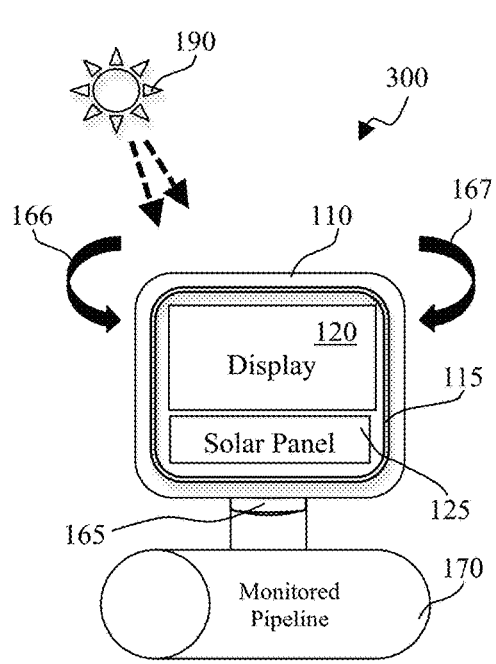
FIGS. 2-3 illustrate a block diagrams depicting another exemplary embodiment of an energy harvesting system deployed in association with a monitored process or device that includes an electromechanical mechanism configured to orient a display associated with the energy harvesting system towards solar energy, in accordance with an embodiment.

Referring to FIG. 3, a block diagram 300 is depicted wherein the common housing 110 is connected to the rotatable stem (step motor 165 and stem 147). The rotatable stem can electromechanically rotate the common housing 110 as indicated by arrows 166 and 167. A rotatable stem when connected to the display panel housing by the stepmotor 165 can orient the display 120 via the common housing 110, and thereby the solar cell 125, towards sunlight according to an internal time clock synchronizing movement of the display panel via the step motor 165 to maintain orientation of the display towards the sunlight 190 and thereby maximize harvesting of electrical energy by the solar cell 125.

Figure 4:
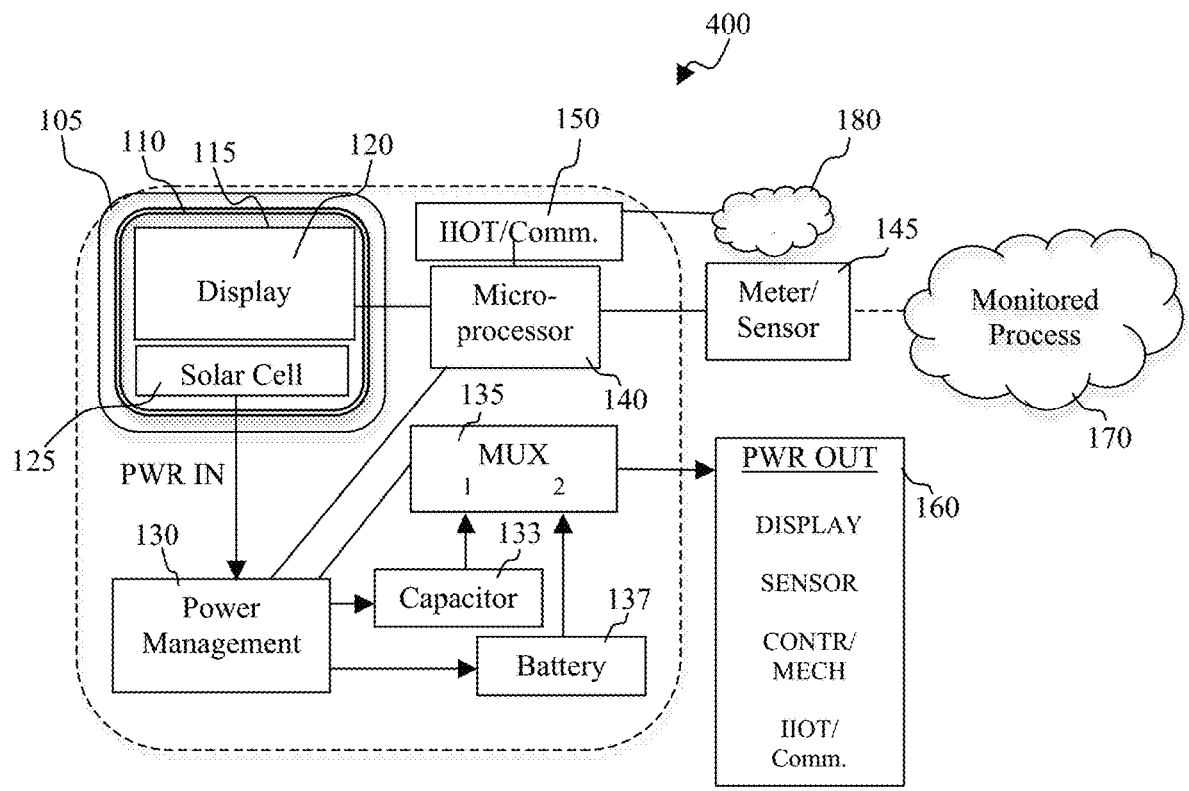
FIG. 4 illustrates another block diagram depicting another example embodiment of an energy harvesting system deployed in association with a monitored process or device wherein the energy harvesting system is integrated with a display associated with the energy harvesting system, in accordance with an embodiment.

Referring to FIG. 4, illustrated is another block diagram 400 depicting another example embodiment of an energy harvesting system deployed in association with a monitored process or device wherein the energy harvesting system can be integrated with a display 120 associated with the energy harvesting system, in accordance with an embodiment. As shown in FIG. 4, the display 120 and solar cell 125 are integrated in a common housing 110 beneath a protective layer of laminated safety glass 115. A power management module 130 can receive power input from the solar cell 125 and can distribute the power input to a capacitor 133 and a rechargeable battery 137 battery. The power management module 130 can cooperate with at least one of a multiplexer 135 and a microprocessor 140 to provide electrical power from the capacitor 133 (first) and rechargeable battery 137 (second) as output power (Pwr out) to electronic components (e.g., IIOT/Comm 150, Meter/Sensor 145, Display 120) associated with supporting monitoring operations of a monitored process 170 (or devices). The foregoing components can be included in as a system 105.

The system 105 depicted in FIG. 4 provides an exemplary framework that can carry out aspects of the embodiments. The system 105 can be configured to communicate wirelessly and bidirectionally with a remote monitoring station or control room (not shown) through a wireless data network 180. The remote monitoring station can include a server that can also communicate wirelessly and bidirectionally via the wireless data network 180 with the system 105 to obtain and exchange data and instructions between the electronics associated with monitored processes and devices and the server.

The wireless data network 180 can be a wireless network such as a packet based wireless data network. Such a wireless network may be employ stand-alone ad-hoc networks, mesh networks, wireless LAN (WLAN) networks, cellular networks, or the like. The wireless data network 180 can further include a system of terminals, gateways, routers, or the like coupled by wireless radio links, or the like, which may move freely, randomly, or organize themselves arbitrarily, such that network topology may change, at times even rapidly. The data network 108 network can further employ a plurality of network access technologies including Long Term Evolution (LTE), WLAN, Wireless Router (WR) mesh, or 2nd, 3rd, 4$^{th}$, 5th generation (2G, 2.5G, 3G, 4G 5G) cellular technology, or the like. Network access technologies can enable wide area coverage for devices, such as client devices with varying degrees of mobility, for example.

The wireless data network can enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, LoRa, Zigbee, NB-IoT, 802.11b/g/n, or the like. The wireless data network 180 can include virtually any type of wireless communication mechanism by which signals may be communicated between devices, such as a client device or a computing device, between or within a network, or the like.

In wireless data networks, signal packets can be communicated in the context of a network of participating digital communication networks that can be compatible with or compliant with one or more protocols. The signaling formats or protocols employed can include, for example, TCP/IP, UDP, DECnet, NetBEUI, IPX, AppleTalk, or the like. Versions of the Internet Protocol (IP) can include IPv4 or IPv6.

The wireless data network can be the Internet or may be linked to or incorporate the Internet. The Internet refers to a decentralized global network of networks. The Internet can include local area networks (LANs), wide area networks (WANs), wireless networks, or long haul public networks that, for example, allow signal packets to be communicated between LANs. Signal packets can be communicated between nodes of a network, such as, for example, to one or more sites employing a local network address. A signal packet can, for example, be communicated over the Internet from a user site via an access node coupled to the Internet. Likewise, a signal packet can be forwarded via network nodes to a target site coupled to the network via a network access node, for example. A signal packet communicated via the internet may, for example, be routed via a path of gateways, servers, etc., that can route the signal packet in accordance with a target address and availability of a network path to the target address.

The wireless data network 180 can facilitate wireless communication. The phrase "wireless communication" and the like, can relate to radio frequency or other electromagnetic communication. In some embodiments, wireless communication can include a wireless communication standard such as IEEE 802.11a, 11b, 11g, or 11n. However, in the context of the invention, there is no particular requirement that wireless communication or a communication network must necessarily (1) use radio spectrum, (2) use electromagnetic communication, or even (3) be entirely confined to untethered communication coupling.

The phrases "mobile device", "wireless station", "mobile station" and the like, generally refer to devices capable of supporting wireless communication. In some embodiments, mobile devices or wireless devices can implement a wireless communication standard such as IEEE 802.11a, 11b, 11g, or 11n. However, in the context of the invention, there is no particular requirement (1) that this particular communication standard is used, e.g., the wireless communication might be conducted according to a standard other than 802.11, or even according to a an IEEE standard entirely, or (2) that all wireless devices each use the same standard or even use inter-compatible communication standards.

The remote monitoring station or control room can further communicate via bidirectional wireless communications with electronic components such as a meter/sensor 145 of a monitored process 170, such as an energy distribution system. The electronic components may be, for example, a field device as a part of a group of field devices in an industrial setting such as a manufacturing plant, a hydrocarbon processing facility, public utility control facilities and so on. Examples of electronic components include sensors, metering devices, a controller, etc. Such electronic components can include instruments that may be distributed in a single facility or a group of facilities or over, for example, hundreds of miles with or without remote accessibility and typically off-grid (meaning lacking electrical power from wired electric power service providers, or public utility companies).

The communications module 150 can communicate with via bidirectional wireless communications such as, for example, the wireless data network 180 or via, for example, radio frequency (RF) communications, such as Bluetooth®. Note that as utilized herein, Bluetooth relates to a wireless communications standard for exchanging data between fixed and mobile devices over short distances using radio frequencies. Thus, the communications module 150 can communicate wirelessly via such RF communications, or via the wireless data network 180.

An app such as app or software app can configure the microprocessor to, for example, to manage a process of metering or monitoring components, perform diagnostics and provide data to the display 120 or remote facilities via wireless communications 180. Such apps may also be configured to father data from monitored processes and devices.

Figure 5:
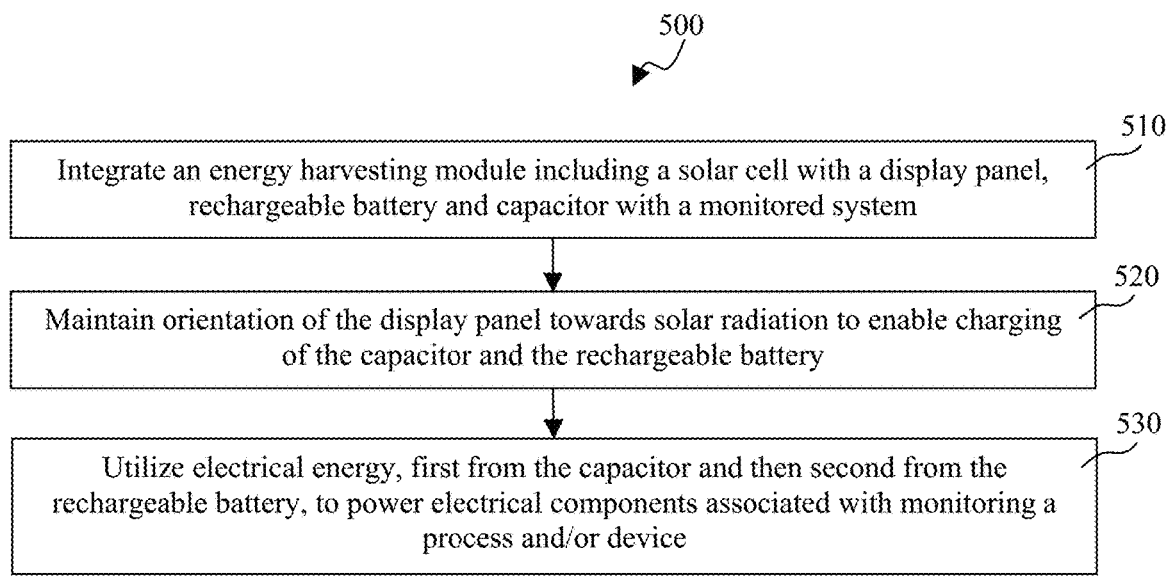
FIG. 5 illustrates a flow chart depicting logical operation steps of a method for harvesting energy for a monitored process or device, in accordance with an embodiment.

FIG. 5 illustrate a flow chart 500 of operations depicting logical operation steps of a method for harvesting energy an powering electronic components engaged in the monitoring of processes and/or devices, in accordance with an embodiment. As indicated at block 510, an operation can be implemented in which an energy harvesting module including a solar cell, rechargeable battery and capacitor managed by a power management module is integrated with a monitored system. As indicated in Block 520, orientation of the display panel towards solar radiation is maintained to enable charging of the capacitor and the rechargeable battery. Then, as shown in Block 530, electrical energy, first from the capacitor and then second from the rechargeable battery, is utilized to power electrical components associated with the monitoring of a process and/or device.

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a system composed of different hardware and software modules and different types of GUI features may be considered a special-purpose computer designed with the specific purpose of rendering a visualization. In general, embodiments may be implemented as a method, and/or a computer program product at any possible technical detail level of integration. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module (or an engine) as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and ultimately in energy savings and efficiencies in technological systems, such as, for example, the microprocessor 140 shown in FIG. 4. A "module" can perform the various steps, operations or instructions discussed herein. For example, a module may perform the instructions described herein with respect to the blocks in FIG. 5.

The inventors have realized a non-abstract technical solution to the technical problem to improve a computer-technology by improving efficiencies in such computer technology. The disclosed embodiments offer technical improvements to a computer-technology such as a data-processing system, and energy distribution system metering/monitoring that utilizes data-processing systems, and can further provide a non-abstract improvement to a technology via a technical solution to the technical problem(s) identified in the background section of this disclosure.

The disclosed approach represents a concrete and non-abstract improvement over conventional systems. The disclosed approach improves monitoring of processes and devices in remote or off-grid deployments.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system for harvesting energy, comprising:
 a power management system including a solar cell integrated with a display panel into a common housing;

a capacitor and a rechargeable battery connected to the power management system to receive power from the solar cell and to provide electrical power first from the capacitor and then second from the rechargeable battery to electronic components including the display that are engaged in monitoring processes and devices deployed in isolated locations, wherein said electronics include a microprocessor, wherein the microprocessor is programmed to provide data collected from the processes and devices for at least one of display on the display panel and wireless transmission to a remote monitoring station; and a rotatable stem operated by a step-motor and connected to the display panel housing, wherein the rotatable stem is orientable by the step-motor towards sunlight according to an internal time clock synchronizing movement of the display panel via the step-motor and stem to maintain orientation of the display towards the sunlight and thereby maximize harvesting of electrical energy by the solar cell.

2. The system of claim 1, including laminated safety glass covering the solar cell and display panel.

3. The system of claim 1, wherein the electronic components include a meter for an energy distribution system.

4. The system of claim 1, wherein the electronic components include wireless communications configured to provide the data to the remote monitoring system.

5. The system of claim 4, wherein the wireless communications is configured to provide the data to the remote monitoring system via a wireless data network.

6. The system of claim 1, including laminated safety glass covering the solar cell and display panel.

7. The system of claim 1, wherein electrical power is provided first from the capacitor and then second from the rechargeable battery to ensure that prolonged energy capacity is provided to electronic components and to assure uninterrupted operation of the electronics components.

8. The system of claim 1, wherein the rotatable stem is connected to the common housing.

9. A system for harvesting energy and supported off-grid electronic components, comprising:

a power management system including a solar cell integrated with a display panel into a common housing; and a capacitor and a rechargeable battery connected to the power management system to receive power from the solar cell and to provide electrical power first from the capacitor and then second from the rechargeable battery to electronic components including the display that are engaged in monitoring processes and devices deployed in isolated locations and operating off-grid, wherein the electronics include:

a microprocessor, wherein the microprocessor is programmed to provide data collected from the processes and devices for display on the display panel;

a wireless communications module configured to provide the data via wireless transmission to a remote monitoring station, and a rotatable stem operated by a step-motor and connected to the display panel housing, wherein the rotatable stem is orient able by the step-motor towards sunlight according to an internal time clock synchronizing movement of the display panel via the step-motor and stem to maintain orientation of the display towards the sunlight and thereby maximize harvesting of electrical energy by the solar cell.

10. The system of claim 9, including laminated safety glass covering the solar cell and display panel.

11. The system of claim 9, wherein the electronic components include a meter for an energy distribution system.

12. The system of claim 9, wherein electrical power is provided first from the capacitor and then second from the rechargeable battery to ensure prolonged energy capacity is provided to electronic components and to assure uninterrupted operation of the electronics components.

13. The system of claim 9, wherein the rotatable stem is connected to the common housing.

14. The system of claim 9, wherein the wireless communications is configured to provide the data to the remote monitoring system via a wireless data network.

15. A method for harvesting energy in support of a monitored system, comprising:

integrating an energy harvesting module including a solar cell with a display panel, a rechargeable battery and a capacitor with a monitored system in a common housing;

maintaining orientation of the display panel, via electro-mechanical manipulation of the common housing, towards solar radiation to enable charging of the capacitor and the rechargeable battery; and utilizing electrical energy, first from the capacitor and then second from the rechargeable battery, to power electrical components associated with monitoring of the monitored system.

16. The method of claim 15, wherein the monitored system is an energy distribution system.

17. The method of claim 15, wherein the method includes the step of gathering data from a meter associated with the monitored system.

18. The method of claim 17, wherein the monitored system is an energy distribution system.

19. The method of claim 15, wherein the monitored system is an energy distribution system.

20. The system of claim 17, wherein the data is provided via a wireless communications network to a remote monitoring system.

* * * * *